United States Patent
Bhattacharya et al.

(10) Patent No.: US 10,375,057 B2
(45) Date of Patent: Aug. 6, 2019

(54) SYSTEMS AND METHODS FOR CERTIFICATE CHAIN VALIDATION OF SECURE ELEMENTS

(71) Applicant: VISA INTERNATIONAL SERVICE ASSOCIATION, San Francisco, CA (US)

(72) Inventors: Soumendra Bhattacharya, Union City, CA (US); Mohit Gupta, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 160 days.

(21) Appl. No.: 15/418,461

(22) Filed: Jan. 27, 2017

(65) Prior Publication Data

US 2018/0219857 A1 Aug. 2, 2018

(51) Int. Cl.
*H04L 29/06* (2006.01)
*H04L 9/32* (2006.01)

(52) U.S. Cl.
CPC ........ *H04L 63/0823* (2013.01); *H04L 9/3265* (2013.01); *H04L 9/3268* (2013.01); *H04L 63/0442* (2013.01); *H04L 63/0807* (2013.01)

(58) Field of Classification Search
None
See application file for complete search history.

(56) References Cited

U.S. PATENT DOCUMENTS

| | | | | |
|---|---|---|---|---|
| 5,922,074 A * | 7/1999 | Richard | ............. | G06F 21/6218 726/21 |
| 6,802,002 B1 * | 10/2004 | Corella | ............. | G06F 21/33 713/155 |
| 7,062,471 B1 * | 6/2006 | Matsuyama | ............. | G06Q 20/04 705/64 |
| 7,269,726 B1 * | 9/2007 | Corella | ............. | H04L 9/006 713/156 |
| 7,444,509 B2 * | 10/2008 | Nadalin | ............. | H04L 9/3263 713/156 |

(Continued)

OTHER PUBLICATIONS

Cooper et al.; Internet X.509 Public Key Infrastructure Certificate and Certificate Revocation List (CRL) Profile; 2008; Retrieved from the Internet <URL: https://tools.ietf.org/html/rfc5280>; pp. 1-151, as printed. (Year: 2008).*

(Continued)

*Primary Examiner* — Saleh Najjar
*Assistant Examiner* — Michael W Chao
(74) *Attorney, Agent, or Firm* — Kilpatrick Townsend & Stockton LLP

(57) ABSTRACT

In certificate chain validation, a parent certificate is used to validate a child certificate. The child certificate can indicate which parent certificate can be used to validate it. In some situations, a child certificate may not contain a certificate authority identifier that can be used to identify the parent certificate. Instead, the child certificate can contain a hash value of a modulus of the parent public key that can be used to identify the parent certificate. The hash value of the modulus of the parent public key can be associated with the parent public key. As such, the parent public key used in certificate chain validation of the child certificate can be identified using the hash value of the modulus of the parent public key.

21 Claims, 6 Drawing Sheets

(56) References Cited

U.S. PATENT DOCUMENTS

| | | | | |
|---|---|---|---|---|
| 8,522,035 B2* | 8/2013 | Sherkin | ............ | H04L 9/006 |
| | | | | 713/176 |
| 2002/0133723 A1* | 9/2002 | Tait | ............ | H04L 63/029 |
| | | | | 726/10 |
| 2006/0047962 A1* | 3/2006 | Adams | ............ | H04L 63/0442 |
| | | | | 713/175 |
| 2009/0006844 A1* | 1/2009 | Wing | ............ | H04L 63/126 |
| | | | | 713/156 |
| 2015/0095648 A1* | 4/2015 | Nix | ............ | H04W 4/70 |
| | | | | 713/170 |
| 2015/0213433 A1* | 7/2015 | Khan | ............ | G06Q 20/3227 |
| | | | | 705/71 |
| 2015/0288514 A1* | 10/2015 | Pahl | ............ | H04L 9/085 |
| | | | | 713/171 |
| 2017/0338958 A1* | 11/2017 | Medvinsky | ............ | H04L 9/3263 |

OTHER PUBLICATIONS

Cooper et al.; Internet X.509 Public Key Infrastructure: Certification Path Building; 2005; Retrieved from the Internet <URL: https://www.rfc-editor.org/rfc/pdfrfc/rfc4158.txt>; pp. 1-81, as printed. (Year: 2005).*

* cited by examiner

SYSTEMS AND METHODS FOR CERTIFICATE CHAIN VALIDATION OF SECURE ELEMENTS

BACKGROUND

Computing devices may use public key cryptography for authentication. For example, a computing device can store a certificate that can be authenticated using certificate chain validation. Certificate chain validation is an iterative process that validates the signature of a signed certificate using the public key of a parent certificate in a chain of certificates. This process continues iteratively until a root public key of a certificate authority is used to validate the signature of the prior certificate within the chain of certificates. Thus, the computing device may be authenticated by virtue of the entire certificate chain being validated by the certificate authority, which is a trusted entity. Once a computing device has been authenticated, a service provider may provide account information or services to the computing device or to a user of the computing device.

Many computing devices are capable of being authenticated through a certificate chain validation process. For example, smartphones and other mobile devices comprise a secure element (e.g., a microchip having separate and secure memory and execution) that stores signed certificates for authentication. The secure elements of such devices may be loaded with the authentication certificates during the manufacturing process. However, some devices may have secure elements storing certificates that have limited authentication capabilities. Such authentications limitations may be due to the narrow scope of the device's intended use (e.g., the device was intended to be authenticated by a single certificate authority). It may be impractical or impossible to load additional certificates onto existing secure elements. Furthermore, it would be costly and time consuming to manufacture new secure elements having more robust authentication capabilities.

Embodiments of the present invention address these and other problems individually and collectively.

BRIEF SUMMARY

Some embodiments of the invention relate to systems and methods for authenticating a device, e.g., smart phone, smartwatch, or activity tracker device. Such devices can store certificates that can be provided to authentication server. The authentication server can validate a device certificate using a certificate chain validation process. This process can involve identifying a parent certificate of the device certificate and then validate the device (child) certificate using the parent certificate. In some cases, the authentication server can store a plurality of parent certificates for validating certificates from a variety of different devices. The authentication server can determine which parent certificate to use for authenticating a certain child certificate based on an identifier of the parent certificate that is included in that child certificate.

Some devices may have limited authentication capabilities. For example, the device certificate may not identify the parent certificate that can be used to validate the device certificate. Such device certificates may be used in authentication systems where there is only one, or a limited number of, parent certificates that are used for authentication. However, in authentication systems that use a plurality of different parent certificates for authenticating a variety of different devices, it may be impractical or impossible for the authentication server to authenticate certificates that do not identify the parent certificate due to the large number of parent certificates used for authentication.

While it may not be possible to load new certificates onto certain devices due to security constraints, it may be possible to add an identifier of the parent certificate to an existing certificate on a device. For example, a device storing a certificate that does not identify its parent certificate may have a second identifier written to it that can be used for identify the parent certificate. This second identifier can be written to a discretionary data field of the certificate, for example. As such, the authentication server can identify the parent certificate using either the identifier of the parent certificate or using the second identifier that was written to the certificate. The second identifier of the parent certificate may be a "Secure Hash Algorithm 1" (SHA-1) hash value of the modulus of the public key of the parent certificate. The authentication server can use this hash value to identify the parent certificate. The authentication server can identify the parent certificate corresponding to second identifier value using a table or database containing associations of second identifiers to parent certificates or parent public keys. As such, the authentication server can identify which parent certificate to use for validation of a child certificate using two different identifiers, the original parent identifier or second identifier value written later. Therefore, the parent certificate of a device certificate can be identified even if the device certificate does not originally include a parent certificate identifier at the time of manufacturing.

Other embodiments are directed to systems, devices, and computer readable media associated with the authentication methods described herein.

A better understanding of the nature and advantages of embodiments of the present invention may be gained with reference to the following detailed description and the accompanying drawings.

TERMS

Figure 1:
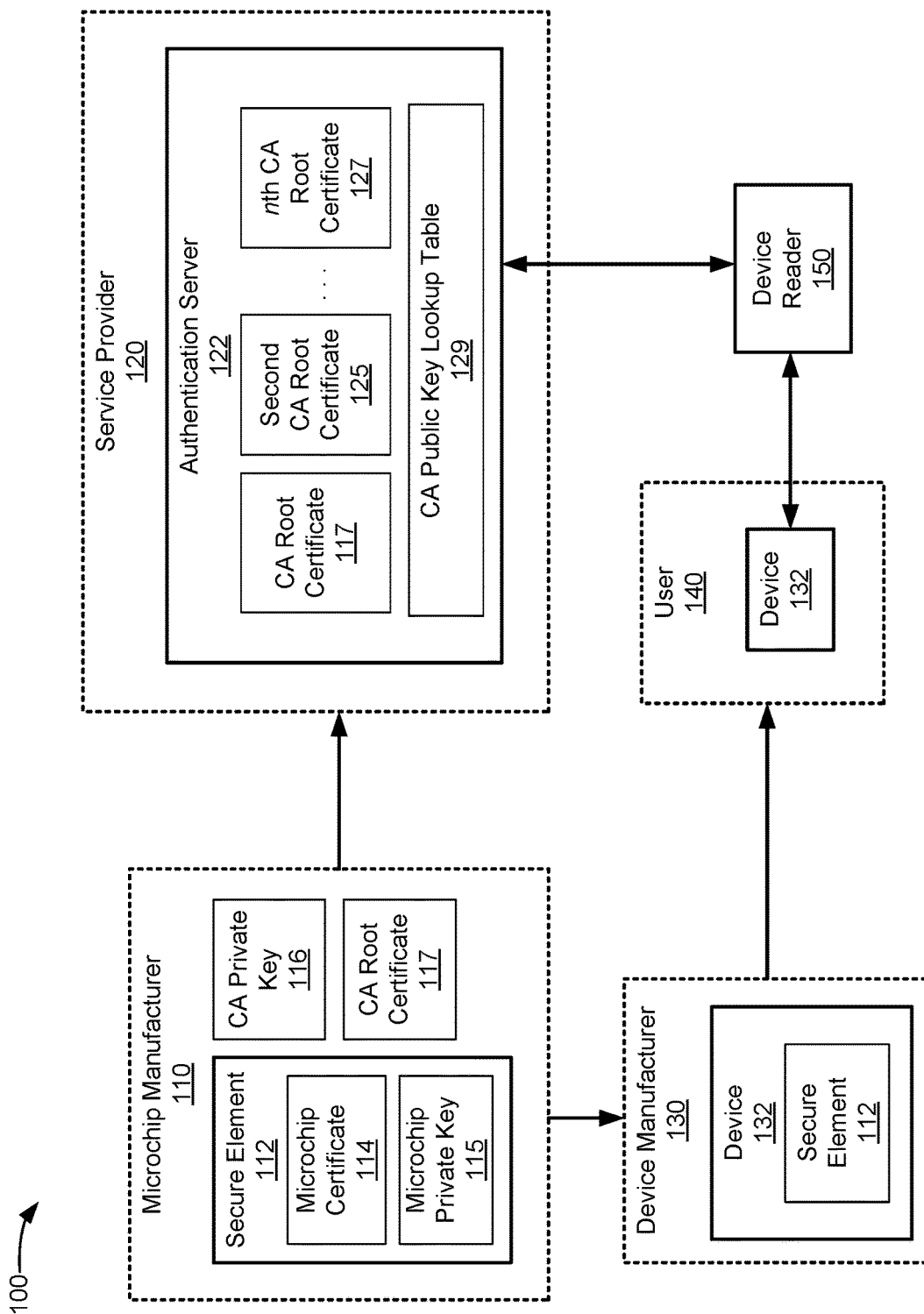
FIG. 1 shows a system for providing a certificate to a device for authenticating with an authentication server, in accordance with some embodiments.

Prior to discussing embodiments of the invention, description of some terms may be helpful in understanding embodiments of the invention.

The term "server computer" refers to a computer or cluster of computing devices. For example, the server computer can be a large mainframe, a minicomputer cluster, or a group of servers functioning as a unit. The server computer may be coupled to a database and may include any hardware, software, other logic, or combination of the preceding for servicing the requests from one or more client computers. In one example, the server computer may be a database server coupled to a Web server. The server computer can comprise one or more computational apparatuses and may use any of a variety of computing structures, arrangements, and compilations for servicing requests received from one or more client computers.

The term "public/private key pair" refers to a pair of linked cryptographic keys generated by an entity (e.g., a computer or an electronic device). The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" or "signature" refers to the result of applying an algorithm (e.g., a hashing algorithm) based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document, and the so-called principle of nonrepudiation, which does not allow disowning what has been signed. A certificate or other data that is used to create a digital signature by a signing party is said to be "signed" by the signing party.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate. Unless otherwise noted, each certificate is signed by a certificate authority. The certificates may be a controlling authority security domain (CASD) certificate. The certificates may be validated per the X.509 standard.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA may maintain a database of all certificates issued by the CA, and may also maintain a list of revoked certificates. Typically, the certificate authority receives an unsigned certificate from an entity whose identity is known. The unsigned certificate includes a public key, one or more data fields, and a signature (e.g., a hash of data in the certificate). The CA signs the certificate with a private key corresponding to the public key included in the CA certificate. The CA may then store the signed certificate in a database, and issue the signed certificate to the entity.

The term "certificate chain validation" refers to is an iterative process that validates the signature of the first signed certificate within a chain of certificates using a public key of the signer of the first certificate. The public key of the signer of the first certificate is included in the second certificate within the chain of certificates. The second certificate may be validated similarly. This process continues iteratively until a root public key of a certificate authority is used to validate the signature of the prior certificate within the chain of certificates. Thus, the computing device may be authenticated by virtue of the certificate chain being validated by the certificate authority, which is a trusted entity. Once a computing device has been authenticated, a service provider may provide account information or services to the computing device or a user of the computing device.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

A "tag" or "certificate tag" refers to data field within a certificate that is associated with a specific identifier. The tag is associated with a value of the data field. A certificate may have a plurality of tags and associated values that may be used during an authentication process. The tag identifier may be a hexadecimal identifier (e.g., "42," "5F20," or "53," or "5F37"). The tag may have a minimum or maximum bit-length (e.g., 1-16 bytes, or 4 bytes) and a specified description (e.g., "certificate serial number," "CA identifier," "subject identifier," or "discretionary data"). In some cases, a tag may be blank or null (e.g., when the associated value is unknown).

A "secure element" refers to a tamper-resistant platform (e.g., a secure microchip comprising a secure microcontroller and secure memory) capable of securely executing applications and storing data (e.g. cryptographic keys). A secure element may be embedded within a computing device itself or it may be embedded within a subscriber identity module (SIM). The secure element may be secure because data stored within the secure element cannot be directly access, as memory can be accessed, but instead can only be accessed via requests made to the microcontroller of the secure element, which may implement a set of rules and requirements for access. Secure elements may via electrical contacts or via a contactless interface (e.g., near-field communications).

DETAILED DESCRIPTION

Service providers may only provide data or services to computing devices that can be authenticated in order to prevent unauthorized access. Devices can store certificates that can be authenticated using a certificate chain validation process. In certificate chain validation, each certificate can be iteratively validated using the next certificate in the parent-child hierarchy. For example, a device certificate can be validated using a public key of a first parent certificate, and the first parent certificate can be validate using a root public key of a root certificate. In this example, the first parent certificate is the parent of the device certificate and the root certificate is the parent of the first parent certificate. The root certificate may be self-validated.

In a typical certificate chain validation process, the parent public key corresponding to a particular child certificate is identified, and that parent public key is used to validate the signature of the child certificate. Typically, the certificate authority that signed a child certificate may be identified by a CA identifier (e.g., parent certificate identifier) in the child certificate. A device be authenticated if each certificate within the parent-child hierarchy, starting from the device certificate, can be identified and validated.

Identifying which parent certificate to use for validation of a child certificate may be problematic if the child certificate does not contain an identifier of its parent certificate. For example, certain secure element microchips are manufactured with signed certificates that do not include a CA identifier value. These microchips may be used in authentication systems where the CA does not need to be identified because the authentication server only uses a single CA root certificate for authentication. However, in other authentication systems, the authentication server can store a plurality of root certificates for authentication. Therefore, an authentication server needs to identify the CA root certificate that corresponds to the received device certificate. However, it may not be possible to write the CA identifier to an existing certificate, particularly when the existing certificate is in a secure element of a device. Furthermore, it may be impractical or impossible for an authentication server to identify the proper CA root certificate through trial-and-error due to the computational complexity of validating the signature and the large number of root certificates stored at the authentication server. Therefore, it may not be possible for some certificates to be used in certain authentication systems if the certificates do not have a CA identifier value in the CA identifier field.

Systems and methods that address this problem are described below.

I. Authentication of Secure Elements Using Certificate Chain Validation

Secure element microchips can store certificates for authenticating with a service provider. These certificates may be validated using a certificate chain validation process in which the certificate authority that signed the certificate is identified, and the public key of that certificate authority is used to verify the signature of the certificate. Typically, a certificate has a CA identifier tag that is used to identify the corresponding certificate authority that signed that certificate. However, certain secure element microchips are manufactured without a CA identifier value stored in the certificate. These microchips may be provided to device manufacturers that manufacture devices for a wide range of purposes. Some service providers may only provide services to one type of device. If the secure elements of those devices are provided by one device microchip manufacturer, then only one certificate authority public key may be used to authenticate those devices. Accordingly, the service provider does not need to identify which certificate authority public key to use for authentication because only one public key may be used.

However, some service providers provide services to a number of different types devices comprising different secure element microchips. Accordingly, an authentication server of the service provider can store numerous different certificate authority public keys for authenticating different devices. Devices having certificates that do not identify their corresponding certificate authority may not be able to be used with such service providers since the services provider may not be able to identify which of the numerous different certificate authority public keys to use for authenticating such devices.

A. System for Authenticating Secure Elements Using Certificate Chain Validation

An improved system for authenticating secure elements using certificate chain validation is described herein. In some embodiments, a hash value or other identifier value derived from the parent public key may be written to a discretionary data field of the certificate within the secure element. As such, the certificate authority of that certificate can be identified even if the certificate does not include a CA identifier tag value to identify the certificate authority.

FIG. 1 shows a system 100 for providing a certificate to a device 132 for authenticating with an authentication server 122, in accordance with some embodiments. The system 100 includes a microchip manufacturer 110. The microchip manufacturer 110 may be a manufacture of semiconductor chips including secure element microchips. The microchip manufacturer 110 can manufacture a secure element 112, which is a microchip that can be embedded within the device 132.

A microchip certificate 114 can be stored in the secure element 112 during an onboarding process. The microchip certificate 114 includes a microchip public key and a signature. The signature of the microchip certificate 114 may be generated by signing the microchip public key, and potentially other data, using a certificate authority (CA) private key 116 of the microchip manufacturer 110. In this embodiment, microchip manufacturer 110 can act as the certificate authority for the microchip certificate 114. In other embodiments, a different entity may be the certificate authority of the microchip certificate 114.

A CA root certificate 117 (including a public key that corresponds to CA private key 116) of the microchip manufacturer 110 may be used to validate the signature of the microchip certificate 114. As such, the microchip certificate 114 is the "child" and the CA root certificate 117 is the "parent" within a parent-child hierarchy for certificate chain validation. In some embodiments, the CA root certificate 117 may be "self-signed" by the CA private key 116. The secure element 112 also contains a microchip private key 115 corresponding to the microchip public key of the microchip certificate 114. The microchip private key 115 and the microchip public key form a cryptographic key pair. The microchip certificate 114 also includes a plurality of certificate tags.

Typically, digital certificates include a public key, a signature, and a plurality of certificate tags. These tags may indicate a serial number of the certificate, an effective date of the certificate, an expiration date of the certificate, a CA identifier of the CA that signed the certificate, or other various other details and parameters for authentication using the certificate. Table 1 below shows tags in a certificate, the bit-length of the corresponding tag, and a description of the values within those tags.

TABLE 1

| Tag | Length | Description |
| --- | --- | --- |
| 7F21 | Variable | Certificate |
| 93 | 1-16 | Certificate Serial Number |
| 42 | Variable | CA Identifier |
| 5F20 | 1-16 | Subject Identifier |
| 95 | 1 | Key Usage |
| 5F25 | 4 | Effective Date |
| 5F24 | 4 | Expiration Date |

TABLE 1-continued

| Tag | Length | Description |
|---|---|---|
| 45 | Variable | CA Security Domain Image Number |
| 53 | 1-127 | Discretionary Data |
| 5F37 | Variable | Signature |
| 5F38 | Variable | Public Key Modulus Remainder |

As shown in Table 1, the value of Tag 42 of the certificate is the CA identifier, which can be used to identify the parent public key for validating the certificate. The identifier in Tag 42 identifies the certificate authority that signed the certificate. If the signing certificate authority can be identified from the identifier of Tag 42, then the public key of that certificate authority can be identified and used to validate the signature of the certificate. Thus, an authentication server may identify the public key of the certificate authority that signed the certificate based on the value of Tag 42.

While the microchip certificate 114 is signed by the CA root certificate 117 of the microchip manufacturer 110, the microchip certificate 114 may not include an identifier that identifies the CA root certificate 117 or the microchip manufacturer 110. That is, the microchip certificate 114 does not include a CA identifier value in Tag 42 of the microchip certificate 114. For example, the CA identifier value may be a value of zero, an empty value, or a NULL value. As such, the microchip certificate 114 with its present tag values may not be authenticated in an authentication system that uses multiple CA root certificates for authentication.

An identifier value for the CA root certificate 117 may not be written to the microchip certificate 114 of the secure element 112 because the microchip certificate 114 has already been signed using the CA private key 116. Furthermore, it may be impractical for the microchip manufacturer 110 to change their manufacturing and onboarding process to include the CA identifier value in Tag 42 of each microchip's certificate for backward compatibility reasons. Even though the CA identifier Tag 42 may not be changed after the microchip certificate 114 has been signed, other tags of the microchip certificate 114 may be changed after the CA signs the microchip certificate. An identifier of the CA may be written to such tags.

In some embodiments, an key identifier identifying the CA root public key of the CA root certificate 117 may be written to the discretionary data of the microchip certificate 114. As shown in Table 1 above, Tag 53 contains discretionary data. The discretionary data of Tag 53 can include fields for name-value pairs. In this embodiment, Tag 53 of the microchip certificate 114 includes a new field to enable validation of the microchip certificate 114 using the CA root certificate 117. In some embodiments, the name of this new field may be called "CA" and the value of the new field may be a Secure Hash Algorithm 1 (SHA-1) hash value of a modulus of the parent public key (e.g., the CA root public key of the CA root certificate 117). This new field of Tag 53 is shown in Table 2 below.

TABLE 2

| Name | Length | Description |
|---|---|---|
| CA | 20 | SHA-1 hash value of the parent public key modulus |

Public keys contain a modulus and an exponent. While the value of the exponent is typically the same between different public keys (e.g., the exponent typically has the value of "3" or "65537"), the value of the modulus is different between different public keys. Accordingly, the modulus of a public key may be used to identify that public key. While the modulus of the public key may be used to identify the public key, the modulus of the public key may be hashed using the SHA-1 algorithm so that the public key is not specifically identifiable from the hash value alone. Thus, Tag 53 of the microchip certificate 114 can store a name-value pair including the name "CA" and the SHA-1 hash value of the public key modulus of the CA root public key of the CA root certificate 117. In some embodiments, the microchip manufacturer 110 may write the "CA" name and SHA-1 hash value of the parent public key modulus to Tag 53. In other embodiments, this name-value pair may be written by a different entity.

The microchip manufacturer 110 may provide microchips to one or more device manufacturers. In this embodiment, the microchip manufacturer provides their microchips, including the secure element 112, to a device manufacturer 130. The device manufacturer 130 may manufacture or assemble computing devices including secure elements for secure storage of data and credentials. These devices can include mobile devices, such as smart phones, tablets, smartwatches, and activity tracking devices.

The device manufacturer 130 can embed the secure element 112 into the device 132. The device manufacturer 130 can provide the secure element 112 with the microchip certificate 114 during a manufacturing process. After the microchip certificate 114 has been loaded to the secure element 112, the device manufacturer 130, or another entity, can write a second identifier to the microchip certificate 114. For example, the second identifier can be a name-value pair which can be written to a discretionary data field of Tag 53 of the microchip certificate 114. For example, the name value pair can include the name "CA" and the value can be a SHA-1 hash of the modulus of the CA root public key of the CA root certificate 117 (e.g., the parent certificate). As such, the device 132 may be able to be authenticated even if the microchip certificate 114 does not does not include an identifier of the public key of the CA root certificate 117 in Tag 42 of the microchip certificate 114.

The device manufacturer 130 can then provide the device 132 to the user 140. The user 140 of the device 132 may have an account with a service provider 120 in order to receive information (e.g., data) or services from the service provider 120. In some embodiments, the user 140 may enroll their device 132 with the service provider 120 in order to access data and services for their account. For example, the service provider 120 may provide network access to the device 132, or the service provider 120 may provide payment functionality to the device 132.

In order to prevent unauthorized access to their data and services, the service provider 120 may require devices to be authenticated. The service provider 120 can implement an authentication server 122 for authenticating devices using certificate chain validation. Devices, including the device 132, may communicate with the authentication server 122 using a device reader 150. The device reader 150 may communicate with the device 132 via electrical contacts of the secure element 112 or via a contactless interface (e.g., a near-field communications interface) of the secure element 112. The device reader 150 may communicate with the authentication server 122 over a communications network.

In order to be authenticated, devices can provide their signed certificates to the authentication server 122. In this embodiment, the authentication server 122 stores numerous certificates for authenticating a variety of different devices. As shown, the authentication server 122 stores the CA root certificate 117 of the microchip manufacturer 110. In some embodiments, the microchip manufacturer 110 may have securely provided the CA root certificate 117 to the service provider 120 or the authentication server 122 off-band. For example, the CA root certificate 117 can be written to a flash drive by the microchip manufacturer 110, and the CA root certificate 117 can be transferred to the authentication server 122 from the flash drive. As such, the authenticity of the CA root certificate 117 is ensured. In other embodiments, the CA root certificate 117 may be provided to the authentication server 122 via secure (e.g., encrypted) network communications.

The authentication server 122 also stores numerous other certificates and the root certificates of other certificate authorities besides the microchip manufacturer 110. For example, the authentication server 122 can store a second CA root certificate 125 and numerous other unspecific CA root certificates. As shown in FIG. 1, the authentication server 122 can store numerous unspecific CA root certificates as shown by the ellipsis between the second CA root certificate 125 and the nth CA root certificate 127. In other embodiments, another computer or device may authenticate the device 132 instead of the authentication server 122.

The authentication server 122 may implement a method for authenticating secure elements using certificate chain validation. This improved method enables the authentication server 122 to identify which parent certificate corresponds to a received certificate even if the received certificate does not include a CA identifier value in Tag 42. The authentication server 122 may determine which public key is the parent public key based on either a CA identifier value of Tag 42 or a hash value stored in Tag 53. The authentication server 122 can store a CA public key lookup table 129 in order to determine the CA public key corresponding to the received certificate by using the value stored in Tag 53.

The CA public key lookup table 129 may associate each stored public with a CA identifier value and a hash value of the public key modulus. Accordingly, if the authentication server 122 receives a certificate containing a CA identifier value in Tag 42, it can look up the corresponding CA root certificate based on the CA identifier value associations within the CA public key lookup table 129. In addition, if the authentication server 122 receives a certificate that does not contain a CA identifier value in Tag 42, the authentication server can look up the corresponding CA root certificate based on the hash value associations within the CA public key lookup table 129. In some embodiments, the CA identifier value associations and the hash value associations may be stored in separate tables. In some embodiments, the authentication server 122 may also associate the values of the "Issuer" field of the certificate and the "Subject" field of the certificate for verification during the lookup.

The authentication server 122 can receive and store the CA root certificate 117. In response to receiving the CA root certificate 117, the authentication server 122 can extract the modulus from the public key of the CA root certificate 117. The authentication server can then perform a hashing algorithm (e.g., SHA-1) on the public key of the CA root certificate 117 to obtain a hash value for the CA root certificate 117. Upon obtaining the hash value for the CA root certificate 117, the authentication server 122 may associate the hash value of the modulus of the public key of the CA root certificate 117 with the public key of the CA root certificate 117 in the CA public key lookup table 129. The authentication server 122 may also associate the hash value of the modulus of the public key of the CA root certificate 117 with the CA root certificate 117 itself in the CA public key lookup table 129. The authentication server 122 may store the CA identifier values and the hash values of the CA public key lookup table 129 as base 64 encoded values. Thus, any of the associations mentioned above may occur via an association between the hash values (or other value derived from the public key) and the CA identifier values.

Using the CA public key lookup table 129, the authentication server 122 may validate the microchip certificate 114 of the device 132. In some embodiments, the authentication server 122 may also verify that an "Issuer" field of the microchip certificate 114 and a "Subject" field of the microchip certificate 114 have the same value, format, and representation as each other. The value of the issuer field and the value of the subject field of the microchip certificate 114 may be stored by the authentication server 122 with base 64 encoding. In some embodiments, these fields may also be used in the lookup performed by the authentication server 122.

In this embodiment, the secure element 112 of the device 132 can send its microchip certificate 114 to the authentication server 122 via the device reader 150. Upon receiving the microchip certificate 114, the authentication server 122 can lookup the corresponding parent certificate and perform a certificate chain validation process.

The authentication server 122 can extract both the CA identifier value from Tag 42 of the microchip certificate 114 and the hash value from the "CA" field of Tag 53. Using the CA public key lookup table, the authentication server 122 can determine whether a stored CA public key is associated with the CA identifier value from Tag 42 or the hash value from Tag 53. In this embodiment, the microchip certificate 114 may not contain a CA identifier value in Tag 42 (e.g., Tag 42 is blank or null). However, the microchip certificate 114 may contain a hash value in Tag 53. If the parent certificate cannot be identified based on the CA identifier value of Tag 42, then the authentication server may attempt to identify the parent certificate using the hash value of the "CA" field of Tag 53.

Using the CA public key lookup table 129, the authentication server can determine that the public key of the CA root certificate 117 is associated with the microchip certificate 114 and that the CA root certificate 117 of the microchip manufacturer 110 is the parent certificate of the microchip certificate 114. Accordingly, authentication server can use the public key of the CA root certificate 117 in performing certificate chain validation of the microchip certificate 114.

The authentication server 122 may authenticate the secure element 112 and the device 132 if the microchip certificate 114 can be validated using the public key of the CA root certificate 117. If the secure element 112 is authenticated, the service provider 120 may provide data or services to the device 132 of the user 140.

In prior authentication systems, an authentication server may not be able to validate a child certificate if the certificate authority does not include the CA identifier value in Tag 42. As described above, the present embodiment improves upon prior authentication systems by including a hash value of the public key modulus of the parent certificate in a "CA" field of Tag 53 of the child certificate. This enables the authentication server to look up the parent certificate using either the CA identifier value in Tag 42 or the hash value in Tag 53. Thus, the present embodiment enables certificates lacking the CA identifier value in Tag 42 to be authenticated, which was previously impractical or impossible. The system 100 is especially advantageous because the secure element 112 can store the sensitive account information that needs to be used for receiving data or services from the service provider 120. As such, the service provider 120 may need to authenticate the secure element 112 itself and not any other component of the device 132. Another advantage is that certain microchip manufacturers do not have to break backwards compatibility in their processes in order to provide the CA identifier values in Tag 42.

Methods for identifying the parent certificate for authentication of the child certificate are described in further detail below.

B. Method for Authenticating Secure Elements Using Certificate Chain Validation

As discussed above, some certificates may not include a CA identifier value in Tag 42. In this case, a hash value may be included (in the "CA" field of Tag 53 of the certificate) to identify the parent certificate. An authentication server may associate a public key of a CA root certificate with both a CA identifier value and a hash value of the modulus of the public key of the CA root certificate. Then, when the authentication server receives a child certificate for validation, it can look up the corresponding parent certificate using either the CA identifier value or the hash value of the modulus of the public key of the CA root certificate.

Figure 2:
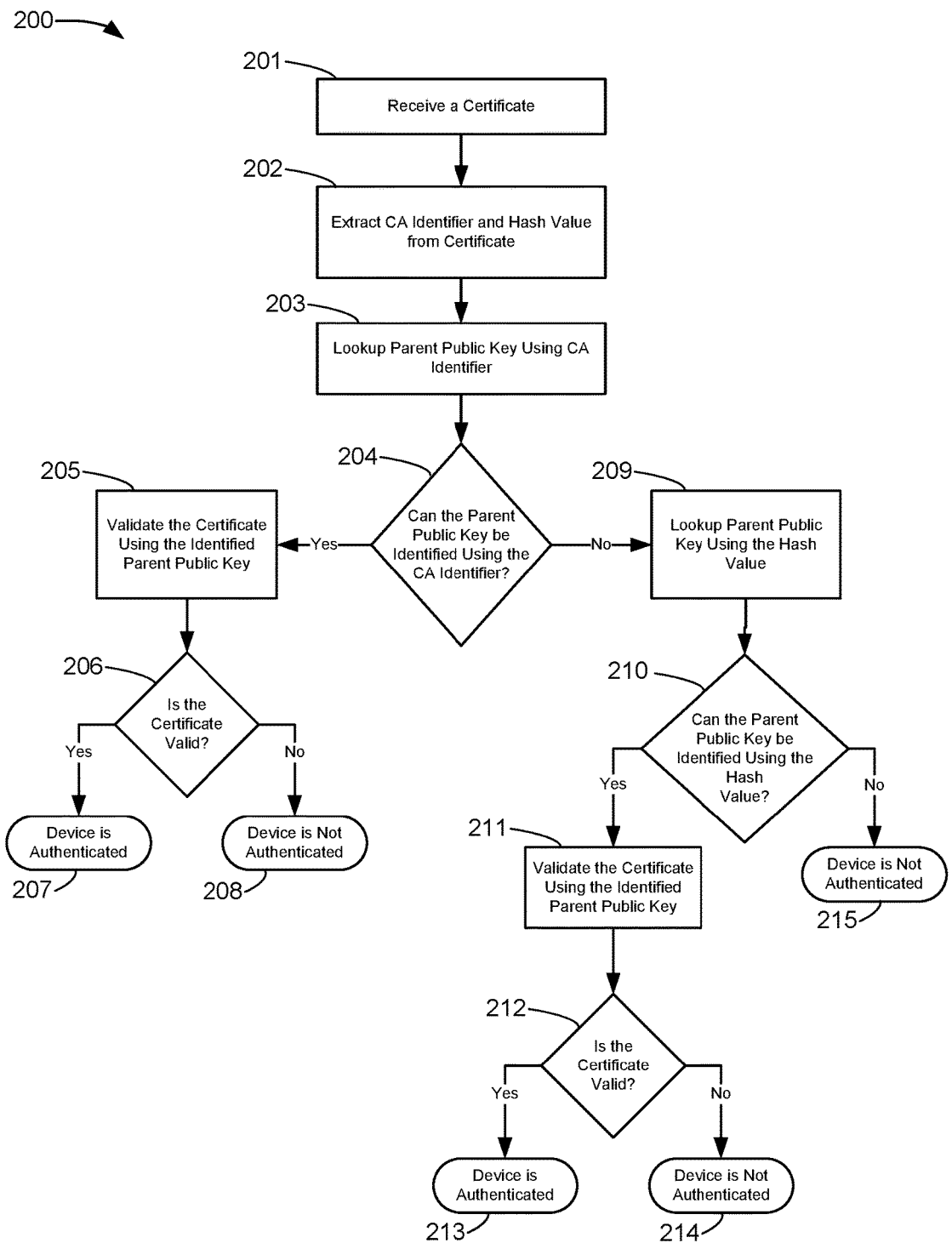
FIG. 2 shows an authentication method that includes identifying a parent certificate for validating a child certificate, according to some embodiments.

FIG. 2 shows an authentication method 200 that includes identifying a parent certificate for validating a child certificate, according to some embodiments. Method 200 can determine whether a device providing a certificate is authenticated. Method 200 may be performed by the authentication server 122 in the system 100 described above with respect to FIG. 1. As shown in FIG. 2, the method 200 begins at step 201 and includes YES/NO decision steps at 204, 206, 210, and 212.

At step 201, method 200 comprises receiving a certificate. The received certificate may be received at an authentication server from a device or a secure element of the device. The certificate may be signed by a CA root private key of a certificate authority and may be validated using a CA root certificate of the certificate authority. As such, the certificate may be a child certificate and the CA root certificate may be the parent certificate of the received certificate for certificate chain validation.

At step 202, method 200 may comprise extracting a CA identifier value and/or a hash value from the received certificate. The CA identifier value may be extracted from Tag 42 of the certificate, and the hash value may be extracted from a "CA" field in Tag 53 of the certificate. The CA identifier value and the hash value may be base 64 encoded.

At step 203, method 200 comprises looking up the parent public key using the CA identifier. The CA identifier may be associated with the parent public key in a lookup table as described above with reference to FIG. 1. The lookup table may include associations for each CA public key used for authentication. These associations may be created when each of the CA root certificates (containing the CA public key) is received.

At decision step 204, method 200 comprises determining whether the parent public key can be identified using the CA identifier. As discussed herein, certain certificates may not include a CA identifier in Tag 42 (e.g., the CA identifier value may be null). Consequently, the parent certificate may not be identifiable based on the CA identifier of the certificate. However, typical certificates may include the CA identifier in Tag 42, and the parent certificate may be identified using the CA identifier value (e.g., because the CA identifier value is associated in a CA public key lookup table).

If the parent public key can be identified using the CA identifier of the certificate, the method continues to step 205 (the YES decision path). If the parent public key cannot be identified using the CA identifier of the certificate, then the method continues to step 209 (the NO decision path).

At step 205, method 200 comprises validating the child certificate using the parent public key identified at step 204. The child certificate may be validated using a certificate chain validation process. Typically, the child certificate will be validated because the CA signed the child certificate using the CA private key corresponding to the public key of the identified parent certificate. However, in some cases, the certificate may no longer be valid, or the CA root certificate may no longer be valid, or there may have been some other error.

At decision step 206, method 200 makes a decision based on whether the child certificate was valid or not. If the child certificate is valid, then the result 207 of the method 200 is that device that provided the child certificate is authenticated (the YES decision path). If the child certificate is not valid, then the result 208 of the method 200 is that the device that provided the child certificate is not authenticated (the NO decision path).

As discussed above, if at step 204 the parent public key cannot be identified using the CA identifier of the child certificate, then method 200 continues to step 209. At step 209, the method 200 comprises looking up the parent public key using the hash value. The lookup table may include has value associations for each CA public key that is used for authentication. These hash values may be a hash value of a modulus of the associated CA public key. These associations may be created when each of the CA root certificates (containing the CA public key) is received.

At decision step 210, method 200 comprises determining whether the parent public key can be identified using the hash value of the child certificate. As discussed herein, certain certificates may not include a CA identifier in Tag 42 (e.g., the CA identifier value may be null) but may instead contain a hash value in a "CA" field of Tag 53 of the certificate to use for identifying the corresponding CA public key.

If the parent public key can be identified using the hash value of the certificate, method 200 continues to step 211 (the YES decision path). If the parent public key cannot be identified using the hash of the certificate, then the result 215 of method 200 is that the device that provided the child certificate is not authenticated (the NO decision path).

At step 211, method 200 comprises validating the child certificate using the parent public key identified at step 209. The child certificate may be validated using a certificate chain validation process. Typically, the child certificate will be validated because the CA signed the child certificate using the CA private key corresponding to the public key of the identified parent certificate. However, in some cases, the certificate may no longer be valid, or the CA root certificate may no longer be valid, or there may have been some other error.

At decision step 212, method 200 makes a decision based on whether the child certificate was valid or not. If the child certificate is valid, then the result 213 of method 200 is that device that provided the child certificate is authenticated (the YES decision path). If the child certificate is not valid, then the result 214 of method 200 is that the device that provided the child certificate is not authenticated (the NO decision path).

II. Exemplary Computer Systems for Authentication

As discussed above, a device may contain a secure element microchip for securely storing sensitive data. For example, the secure element microchip of the device can store a microchip certificate for authentication of the secure element microchip of the device. As discussed above with reference to FIG. 1, the device may provide the microchip certificate to an authentication server in order to authenticate the device. The microchip certificate can contain a hash value or other identifier value such that the authentication server can identify the certificate authority of the device's secure element. As further described below, the device and the authentication server contain numerous electronic components to perform the processes described herein.

A. Exemplary Device with Secure Element

Figure 3:
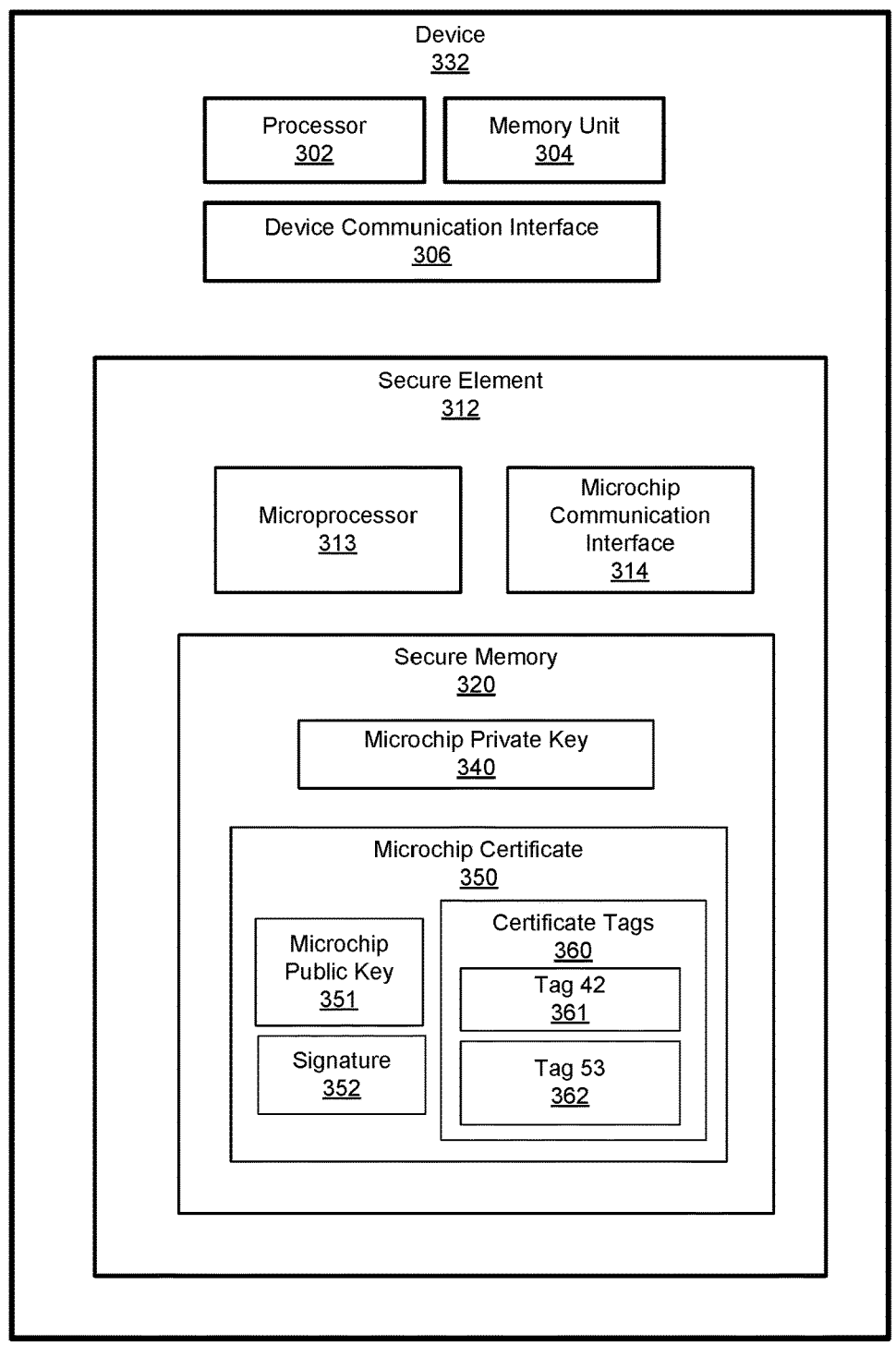
FIG. 3 shows a block diagram components of a device including a secure element, according to some embodiments.

FIG. 3 shows a block diagram of components of a device 332 including a secure element 312, according to some embodiments. The various components may be embodied by computer hardware or computer code stored on a non-transitory computer readable storage medium. The device 332 may be implemented in a system for authenticating with an authentication server as described above with reference to FIG. 1.

The device 332 can comprise one or more processor circuits 302. The processor circuit 302 may execute instructions to perform the functions of the device described herein (e.g., communicating with an access server). The processor circuit 302 may be coupled to one or more memory units 304 that can store data and instructions. The memory unit 304 may be non-transitory computer-readable storage medium. The processor circuit 302 can read data from the memory unit 304 and write data to the memory unit 304. For example, the processor circuit 302 may read instructions from the memory unit 304 and execute the instructions to perform the functions of the devices described herein.

The device 332 can also comprise a device communication interface 306. The device communication interface 306 may receive communications from a communication interface of another computer, such as communications from an authentication server. The device communication interface 306 may also transmit communications to another computer. In some embodiments, the device communication interface 306 is capable of wireless communications (e.g., cellular or Wi-Fi). In other embodiments, the device communication interface 306 is capable of bluetooth communications or near-field communications. In other embodiments, the device communication interface 306 is capable of Ethernet communications.

The device 332 can also comprise a secure element 312. The secure element 312 is a tamper-resistant platform capable of securely executing applications and storing data (e.g. cryptographic keys). In some embodiments, the secure element 312 is embedded within the device 332. In other embodiments, the secure element 312 is included in a subscriber identity module (SIM) that can be electrically coupled to the device 332.

The secure element 312 can comprise a microprocessor 313. The microprocessor 313 may execute instructions to perform the functions of the secure element described herein (e.g., securely storing a microchip certificate and providing the microchip certificate to an authentication server). The microprocessor 313 of the secure element 312 can execute instructions independent of the processor 302 of the device 332.

The microprocessor 313 or the secure element may communicate with the processor 302 of the device 332 using a microchip communication interface 314. The processor 302 of the device 332 may not directly access a secure memory 320 of the secure element 312. Instead, the processor 302 of the device 332 can communicate with the microprocessor 313 using request-response type communications wherein the processor 302 requests data from the microprocessor 313. The microchip communication interface 314 may also be used to communicate with a device reader as discussed above with reference to FIG. 1. For example, the microprocessor 313 may use the microchip communication interface 314 to send the microchip certificate 350 to a device reader. In some embodiments, the microchip communication interface 314 is be capable of near-field communications.

The microprocessor 313 can read and write data to the secure memory 320 of the secure element. The secure memory 320 can be non-transitory computer-readable storage medium. The microprocessor 313 can read executable instructions from the secure memory 320. The secure element 312 may be secure because data stored within the secure memory 320 of the secure element 312 cannot be directly accessed. Instead, the data of the secure memory 320 can only be accessed via requests made to the microprocessor 313 of the secure element 312. The microprocessor 313 can implement a set of rules and requirements for accessing data stored in the secure memory 320.

The secure memory 320 of the secure element 312 can store a microchip private key 340 and a microchip certificate 350. The microchip certificate 350 can contain a microchip public key 351 corresponding to the microchip private key 340 (e.g., the microchip public key 351 and the microchip private key 340 form a public-private key pair). The microchip certificate 350 can also contain a signature 352. The signature 352 can be created by the certificate authority of the secure element 312 signing the microchip certificate 350 using a certificate authority private key of the certificate authority as described above. The microchip certificate 350 can be used for authenticating the secure element 312 as described above with respect to FIG. 1 and FIG. 2.

The microchip certificate 350 can also contain certificate tags 360. The certificate tags 360 can include "Tag 42" 361 and "Tag 53" 362. In some embodiments, "Tag 42" can contain a CA Identifier value that identifies the certificate authority that signed the certificate (e.g., the CA identifier value can be used to identify the public key of the certificate authority that can be used to validate the microchip certificate 350). In some embodiments, "Tag 53" can contain a name-value pair of "CA" and a hash value of the modulus of the public key of the certificate authority that signed the microchip certificate 350. The hash value of "Tag 53" can be used to identify the public key of the certificate authority which can be used to validate the microchip certificate 350 using a certificate chain validation process.

Using the components described above, the secure element 312 of the device 332 can provide the microchip certificate 350 to an authentication server for authentication of the secure element 312 and the authentication server can identify the CA public key to use for validating the microchip certificate 350 based on the CA identifier value of "Tag 42" or the hash value of "Tag 53" as discussed above.

B. Exemplary Authentication Server

Figure 4:
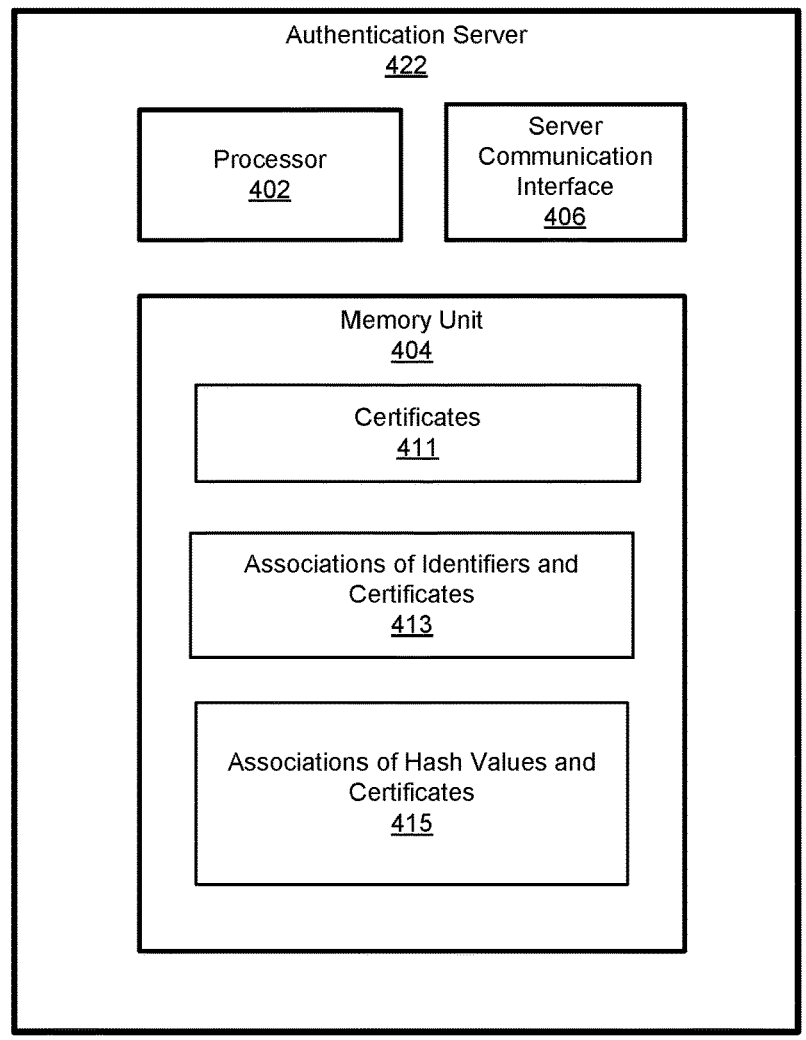
FIG. 4 shows a block diagram of components of an authentication server, according to some embodiments.

FIG. 4 shows a block diagram of components of an authentication server 442, according to some embodiments. The various components of the authentication server 442 may be embodied by computer hardware or computer code stored on a non-transitory computer readable storage medium. The authentication server 442 may be implemented in a system for authenticating a device as described above with reference to FIG. 1. The authentication server 442 may also implement the method for identifying a parent certificate for validation of a child certificate as described above with reference to FIG. 2.

The authentication server 442 can comprise one or more processor circuits 402. The processor circuit 402 may execute instructions to perform the functions of the authentication server described herein (e.g., identifying a CA public key and validating a certificate). The processor circuit 402 may be coupled to one or more memory units 404 that can store data and instructions. The memory unit 404 may be non-transitory computer-readable storage medium. The processor circuit 402 can read data from the memory unit 404 and write data to the memory unit 404. For example, the processor circuit 402 may read instructions from the memory unit 404 and execute the instructions to perform the functions of the devices described herein.

The memory unit 404 can store a plurality of certificates 411 for performing certificate chain validation as discussed above. The memory unit 404 can also store associations of identifiers and certificates 413. For example, a particular CA identifier value can be associated with a particular certificate of the plurality of certificates 411. As discussed above with reference to FIG. 2, an authentication server can receive a certificate, extract a CA identifier value from Tag 42 of the certificate, and use the CA identifier value to identify the parent certificate based on associations of identifiers and certificates 413. In some embodiments, the associations of identifiers and certificates 413 can be in the form of a table.

The memory unit 404 can also store associations of hash values and certificates 415. For example, a particular hash value can be associated with a particular certificate of the plurality of certificates 411. As discussed above with reference to FIG. 2, an authentication server can receive a certificate, extract a hash value from Tag 53 of the certificate, and use the hash value to identify the parent certificate based on associations of hash values and certificates 413. As described above, the hash value may be a hash of the modulus of the public key of the parent certificate. In some embodiments, associations of hash values and certificates 415 can be in the form of a table.

The authentication server 442 can also comprise a server communication interface 406. The server communication interface 406 can receive communications from a communication interface of another computer or computing device, such as communications from a device or device reader. The server communication interface 406 may also transmit communications to another computer or computing device. In some embodiments, the server communication interface 406 is capable of wireless communications (e.g., cellular or Wi-Fi). In other embodiments, the server communication interface 406 is capable of Ethernet communications.

III. Exemplary Method for Authentication

Figure 5:
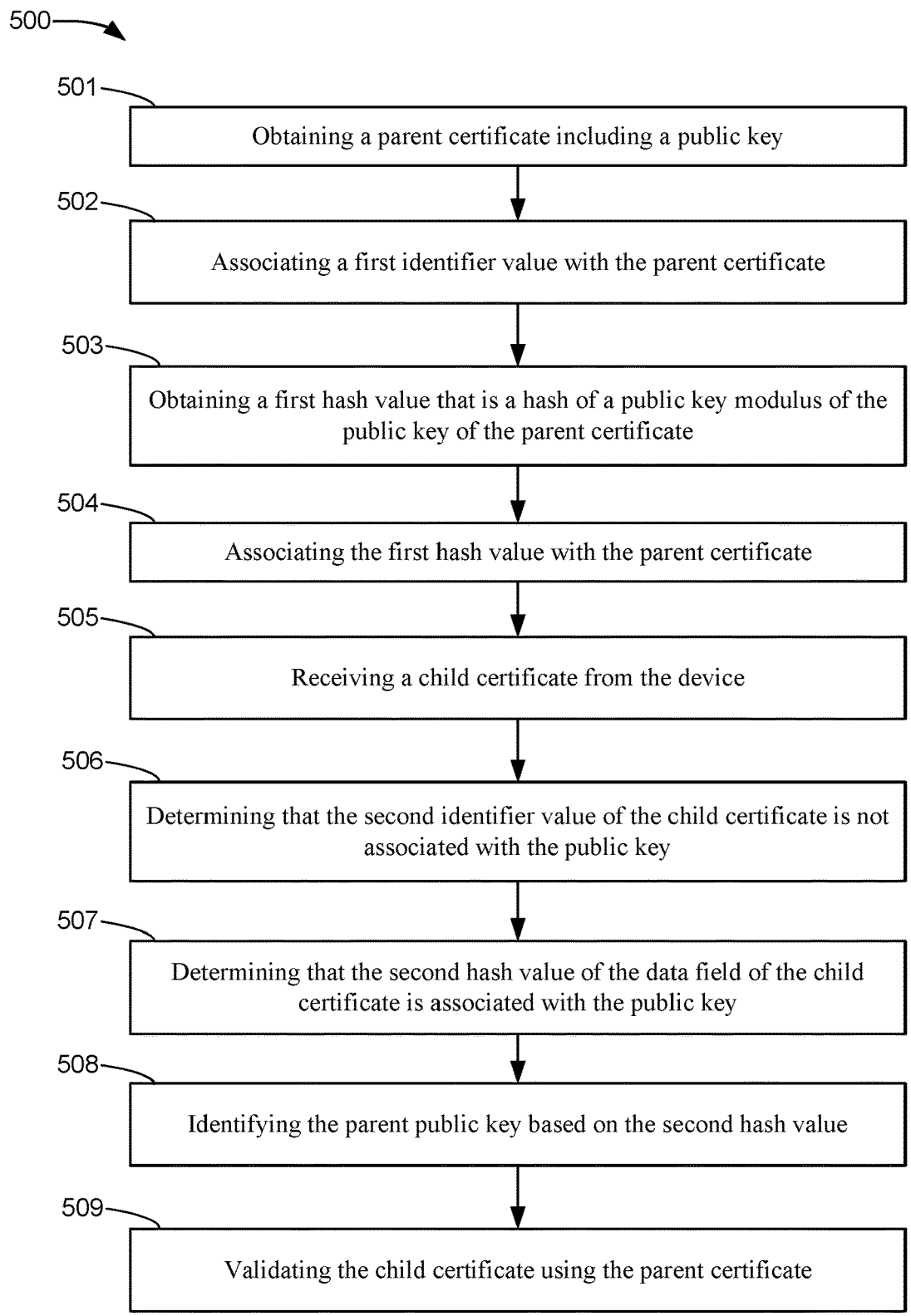
FIG. 5 shows a flowchart of a method for identifying a parent certificate and validating a child certificate, according to some embodiments.

FIG. 5 shows a flowchart 500 of a method for identifying a parent certificate and validating a child certificate, according to some embodiments. The method may be performed by an authentication server as described above with reference to FIG. 1, FIG. 2, and FIG. 4.

At step 501, a parent certificate including a public key is obtained. The parent public key can comprising a public key modulus. The method further includes the step 502 of associating a first identifier value with the parent certificate.

The method further includes the step 503 of obtaining a first hash value that is a hash of a public key modulus of the public key of the parent certificate. In some embodiments, the first hash value of the parent public key modulus is obtained by hashing the parent public key modulus of the public key of the parent certificate to obtain the first hash value. The method further includes the step 504 of associating the first hash value with the parent certificate.

The method further includes the step 505 of receiving a child certificate from the device. The child certificate can contain an identifier field and a data field. The identifier field can comprise a second identifier value which is different from the first identifier value. The data field can comprise a second hash value which is the same as the first hash value associated with the parent certificate. In some embodiments, the method includes the step of extracting the second identifier value from the child certificate.

In some embodiments, the data field of the child certificate can comprise a name-value pair, which comprising a name and a value. In some embodiments, the name can be "CA" and the value can be the second hash value, where the second hash value is the same as the first hash value of the public key modulus of the parent public key of the parent certificate. In some embodiments, the data field can further comprise a first tag which is "Tag 53" and the identifier field can comprise a second tag which is "Tag 42."

The method further includes the step 506 of determining that the second identifier value of the child certificate is not associated with the public key. In some embodiments, the method further includes the step of comparing the second identifier value from the child certificate to one or more identifier values that are respectively associated with one or more parent public keys. In some embodiments, the method further includes the step of determining that the second identifier value from the child certificate is not equal to any of the one or more identifier values that are respectively associated with one or more parent public keys.

The method further includes the step 507 of determining that the second hash value of the data field of the child certificate is associated with the public key. In some embodiments, the method includes the step of extracting the second hash value from the child certificate. In some embodiments, the method further includes the step of comparing the second hash value from the child certificate to one or more hash values that are respectively associated with one or more parent public keys. In some embodiments, the method further comprises the step of determining that the second hash value from the child certificate is equal to the first hash value that is associated with the parent public key. In some embodiments the determination that the second hash value of the data field of the child certificate is associated with the parent public key is performed after the determination that the second identifier value of the child certificate is not associated with the parent public key. In some embodiments, the identification of the parent certificate is based on the second hash value from the child certificate being equal to the first hash value that is associated with the parent public key and the parent public key being the parent public key of the parent certificate.

In some embodiments, the associating of the first identifier value with the parent public key comprises associating the first identifier value with the parent public key in a table, and wherein the associating of the first hash value with the parent public key comprises associating the first hash value with the parent public key in the table. In some embodiments, the method further includes using the second identifier value to lookup a first associated public key in the table where the second identifier value is not associated with any certificate in the table. In some embodiments, the method further includes using the second hash value to lookup a second associated public key in the table where the second hash value is associated with the parent public key in the table.

The method further includes the step 508 of identifying the parent public key based on the second hash value. The method further includes the step 509 of validating the child certificate using the parent certificate. In some embodiment, the method further includes providing a token to the device in response to the validation of the child certificate.

IV. Authentication of Certificates for Provisioning

Figure 6:
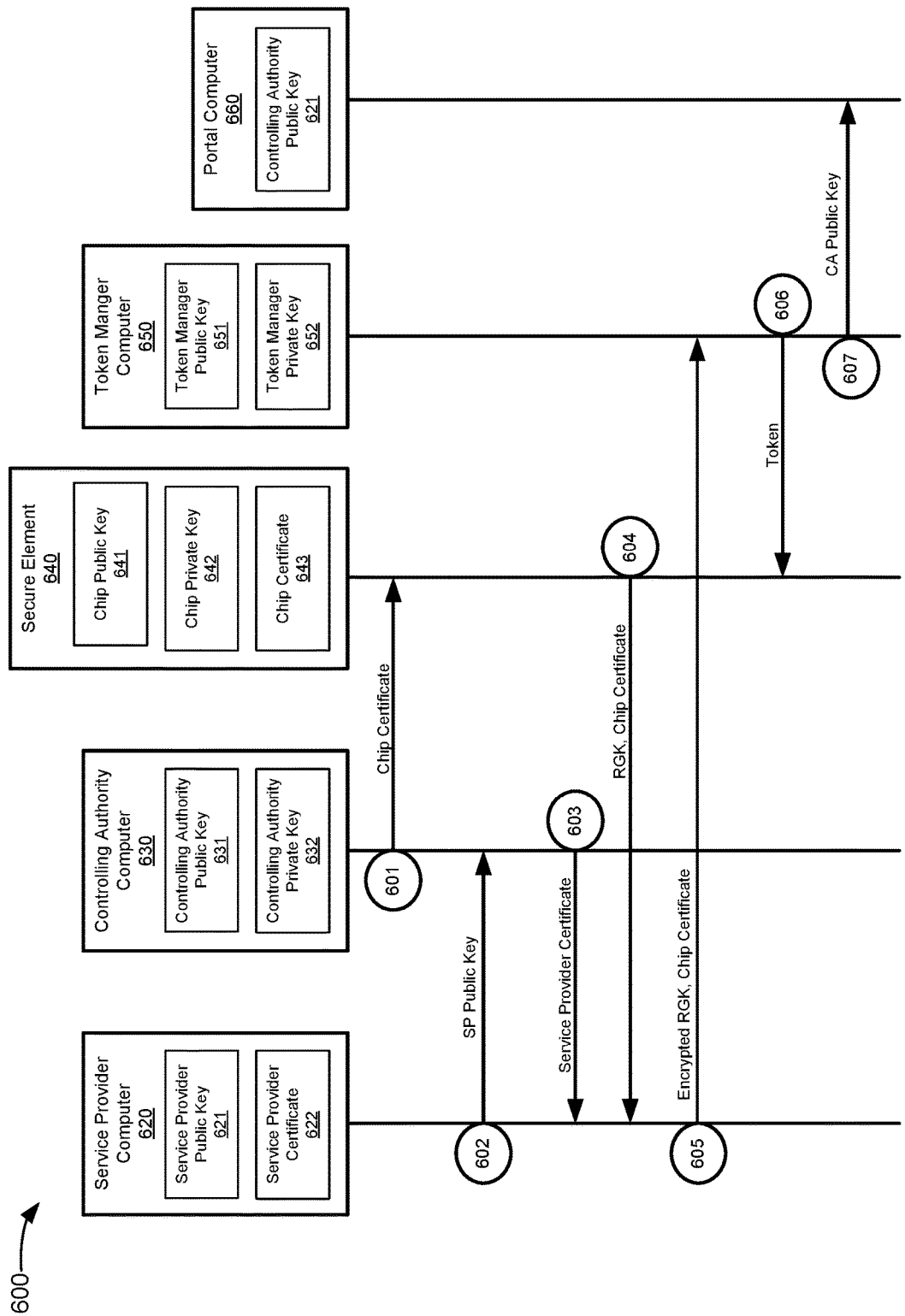
FIG. 6 shows a message flow diagram for authenticating a secure element microchip, according to some embodiments.

The methods described above may be used by a token manager to authenticate a microchip certificate that may not have an identifier of its certificate authority. FIG. 6 shows a message flow diagram 600 for authenticating a secure element microchip 640, according to some embodiments. The system includes a controlling authority computer 630 that can act as the certificate authority for the secure element microchip 640. The controlling authority may be the manufacturer of the secure element microchip 640. The system also includes a service provider computer 620 which can provide services to the secure element microchip 640. The service provider computer 620 may provide payment processing services, for example. The system also includes a token manager computer 650 that can provision a token or authentication certificate to the secure element microchip 640. The system also includes a service provider configuration portal computer 660 that can provide public certificate authority public keys to service providers.

The controlling authority computer 630 can store a controlling authority public key 631 and a controlling authority private key 632 that corresponds to the controlling authority public key 631. The controlling authority public key 631 and the controlling authority private key 632 can form a key pair. The controlling authority public key 631 can include a modulus and an exponent. The secure element microchip 640 can store a chip public key 641 and a corresponding chip private key 642. The chip public key 641 and the chip private key 642 can form a key pair. At 601, the controlling authority computer can sign the chip public key 641 of the secure element microchip to create a chip certificate 643. As such, the controlling authority computer 630 can act as the certificate authority of the secure element microchip 640 since the controlling authority public key 631 can be used to verify the signature of the chip certificate 643. The controlling authority computer 630 can provide the chip certificate to the secure element microchip 640, which can secure store it.

However, the chip certificate 643 generated by the controlling authority computer 630 may not include a certificate authority identifier (e.g., a CA identifier in Tag 42 of the chip certificate 643). that identifies the controlling authority computer 630 as the certificate authority of the chip certificate 643. The controlling authority computer 630 may not include a certificate authority identifier in the chip certificate 643 for various reasons. For example, including the certificate authority identifier in the chip certificate 643 might change an existing certificate generation process of the controlling authority and the new process might break compatibility with other processes of the controlling authority. Instead of including a CA identifier value in the chip certificate 643, the controlling authority computer 630 can include a hash value that identifies the controlling authority computer 630 as the certificate authority. The controlling authority computer 630 can create the hash value by performing a hash function on the modulus of the controlling authority public key 631. The hash value can be included within a discretionary data field of the chip certificate 643. For instance, the hash value can be included within a name-value pair of Tag 53 of the chip certificate 653 where the name is "CA" and the corresponding value is the hash value of the modulus of the controlling authority public key 631.

The controlling authority computer 630 can also be the certificate authority for the service provider computer 620. As the certificate authority, the controlling authority computer 630 can be the signer of the certificate of the service provider computer 620. To create the signed certificate, at 602, the service provider computer 620 can send the service provider public key 621 to the controlling authority computer 630. Then, at 603, the controlling authority computer 630 can receive the service provider public key 621 from the service provider computer 620 and sign the service provider public key 621 using the controlling authority private key 632 to create a service provider certificate 622. As such, the signature of the service provider certificate 622 can be verified using the controlling authority public key 631. The controlling authority computer 630 can then send the service provider certificate 622 to the service provider computer 620, which can receive and store the service provider certificate 622.

At 604, the secure element 640 can generate a randomly generated key (RGK). The secure element 640 can send the RGK and the chip certificate 643 to the service provider computer 620. In some embodiments, the token manager computer 650 can generate the RGK and send it to the service provider computer 620, instead of the secure element 640. The RGK can be randomly generated according to a size requirement (e.g., 128 bits). The RGK can be a base initial key for deriving child keys. For example, the RGK can be used in a key derivation function (KDF) to generate symmetric keys to be used for securing data communication sessions.

At 605, the service provider computer 620 can encrypt the RGK using a token manager public key 651 of the token manager computer 650. The RGK can be encrypted by asymmetric RSA keys of 2048 bit size. The RGK is encrypted to provide data protection and confidentiality for the transmission of the RGK from the service provider computer 620 to the token manager computer 650. The service provider computer 620 can send the encrypted RGK and the chip certificate 643 to the token manager computer 650. In some embodiments, the chip certificate 643 can also be encrypted by the service provider computer 620. The token manager computer 650 can receive the encrypted RGK and the chip certificate 643 from the service provider computer 620.

At 606, the token manager computer 650 can decrypt the encrypted RGK using the token manager private key 652 that corresponds to the token manager public key 651. The token manager computer 650 can use the RGK to perform key derivation function operations to derive symmetric keys for use in secure operations. In order to validate the chip certificate 643, the token manager computer 650 can identify the certificate authority for authenticating the chip certificate 643. The token manager computer 650 can use the authentication method described above with respect to FIG. 2 in order to identify that the controlling authority computer 630 is the certificate authority of the chip certificate 643. For example, the controller authority computer 630 can be identified based on an identifier stored in Tag 42 or Tag 53 of the chip certificate 643.

After identifying the controlling authority, the token manager computer 650 can authenticate the chip certificate 643 using the controlling authority public key 631 and the chip public key 641 which is included in the chip certificate 643. In response to verifying the chip certificate 643, the token manager computer 650 can verify the signature of the signed RGK using the chip public key 641. In response to verifying the signature of the signed RGK, the token manager computer 650 can provide a token, an authentication certificate, or other data to the secure element microchip 640.

At 607, the token manager computer 650 can send the controlling authority public key 631 to the portal computer 660. The portal computer 660 can receive the controlling authority public key 631 from the token manager computer 650. The portal computer 660 can store the controlling authority public key 631 and provide it to other service provider computers upon request in order to authenticate the chip certificate 643.

As such, the secure element microchip 640 can authenticate with a token manager computer 650 using a certificate which does not include a CA identifier value (e.g., chip certificate 643, which may not include a CA identifier value within Tag 42) in order to receive a token from the token manager computer 650.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for authenticating a device by an authentication server, the method comprising:
    obtaining a parent certificate including a parent public key, the parent public key comprising a public key modulus;
    associating a first identifier value with the parent public key;
    obtaining a first hash value of the public key modulus of the parent public key;

associating the first hash value with the parent public key;
receiving a child certificate from the device, the child certificate containing an identifier field, a data field, and a signature based on the identifier field and not based on the data field, the identifier field comprising a second identifier value, the second identifier value being different from the first identifier value, the data field comprising a second hash value, the second hash value of the data field of the child certificate being the same as the first hash value associated with the parent public key;
determining that the second identifier value of the identifier field of the child certificate is not associated with the parent public key;
determining that the second hash value of the data field of the child certificate is associated with the parent public key;
identifying the parent public key based on the second hash value; and
validating the child certificate using the parent public key.

2. The method of claim 1, wherein the data field of the child certificate comprises a name-value pair, the name-value pair comprising a name and a value, the name being "CA" and the value being the second hash value, the second hash value being the same as the first hash value of the public key modulus of the parent public key of the parent certificate.

3. The method of claim 2, wherein the data field further comprises a first tag, the first tag being "Tag 53," and wherein the identifier field comprises a second tag, the second tag being "Tag 42."

4. The method of claim 1, further comprising:
extracting the second identifier value from the child certificate;
comparing the second identifier value from the child certificate to one or more identifier values that are respectively associated with one or more parent public keys, the one or more identifier values respectively associated with the one or more parent public keys including the first identifier value that is associated with the parent public key; and
determining that the second identifier value from the child certificate is not equal to any of the one or more identifier values that are respectively associated with the one or more parent public keys.

5. The method of claim 1, further comprising:
extracting the second hash value from the child certificate;
comparing the second hash value from the child certificate to one or more hash values that are respectively associated with one or more parent public keys, the one or more hash values respectively associated with the one or more parent public keys including the first hash value that is associated with the parent public key; and
determining that the second hash value from the child certificate is equal to the first hash value that is associated with the parent public key,
wherein the identifying of the parent certificate is further based on the second hash value from the child certificate being equal to the first hash value that is associated with the parent public key and the parent public key being the parent public key of the parent certificate.

6. The method of claim 1, wherein the determining that the second hash value of the data field of the child certificate is associated with the parent public key is performed after the determining that the second identifier value of the child certificate is not associated with the parent public key.

7. The method of claim 1, wherein the associating of the first identifier value with the parent public key comprises associating the first identifier value with the parent public key in a table, and wherein the associating of the first hash value with the parent public key comprises associating the first hash value with the parent public key in the table.

8. The method of claim 7, further comprising:
using the second identifier value to lookup a first associated public key in the table, wherein the second identifier value is not associated with any certificate in the table; and
using the second hash value to lookup a second associated public key in the table, wherein the second hash value is associated with the parent public key in the table.

9. The method of claim 1, wherein the obtaining of the first hash value of the public key modulus comprises hashing the parent public key modulus of the parent public key of the parent certificate to obtain the first hash value.

10. The method of claim 1, further comprising providing a token to the device in response to the validating of the child certificate.

11. The method of claim 1, wherein the second identifier value is zero, empty, or null.

12. A system for authenticating a device, comprising:
a processor; and
a memory storing a set of instructions which, when executed by the processor, cause the processor to:
obtain a parent certificate including a parent public key, the parent public key comprising a public key modulus;
associate a first identifier value with the parent public key;
obtain a first hash value of the public key modulus of the parent public key;
associate the first hash value with the parent public key;
receive a child certificate from the device, the child certificate containing an identifier field, a data field, and a signature based on the identifier field and not based on the data field, the identifier field comprising a second identifier value, the second identifier value being different from the first identifier value, the data field comprising a second hash value, the second hash value of the data field of the child certificate being the same as the first hash value associated with the parent public key;
determine that the second identifier value of the identifier field of the child certificate is not associated with the parent public key;
determine that the second hash value of the data field of the child certificate is associated with the parent public key;
identify the parent public key based on the second hash value; and
validate the child certificate using the parent public key.

13. The system of claim 12, wherein the data field of the child certificate comprises a name-value pair, the name-value pair comprising a name and a value, the name being "CA" and the value being the second hash value, the second hash value being the same as the first hash value of the public key modulus of the parent public key of the parent certificate.

14. The system of claim 13, wherein the data field further comprises a first tag, the first tag being "Tag 53," and wherein the identifier field comprises a second tag, the second tag being "Tag 42."

15. The system of claim 12, wherein the set of instructions further includes instructions that, when executed by the processor, cause the processor to:
   extract the second identifier value from the child certificate;
   compare the second identifier value from the child certificate to one or more identifier values that are respectively associated with one or more parent public keys, the one or more identifier values respectively associated with the one or more parent public keys including the first identifier value that is associated with the parent public key; and
   determine that the second identifier value from the child certificate is not equal to any of the one or more identifier values that are respectively associated with the one or more parent public keys.

16. The system of claim 12, wherein the set of instructions further includes instructions that, when executed by the processor, cause the processor to:
   extract the second hash value from the child certificate;
   compare the second hash value from the child certificate to one or more hash values that are respectively associated with one or more parent public keys, the one or more hash values respectively associated with the one or more parent public keys including the first hash value that is associated with the parent public key; and
   determine that the second hash value from the child certificate is equal to the first hash value that is associated with the parent public key,
   wherein the identifying of the parent certificate is further based on the second hash value from the child certificate being equal to the first hash value that is associated with the parent public key and the parent public key being the parent public key of the parent certificate.

17. The system of claim 12, wherein the determination that the second hash value of the data field of the child certificate is associated with the parent public key is performed after the determining that the second identifier value of the child certificate is not associated with the parent public key.

18. The system of claim 12, wherein the set of instructions further includes instructions that, when executed by the processor, cause the processor to:
   associate the first identifier value with the parent public key in a table; and
   associate the first hash value with the parent public key in the table.

19. The system of claim 18, wherein the set of instructions further includes instructions that, when executed by the processor, cause the processor to:
   use the second identifier value to lookup a first associated public key in the table, wherein the second identifier value is not associated with any certificate in the table; and
   use the second hash value to lookup a second associated public key in the table, wherein the second hash value is associated with the parent public key in the table.

20. The system of claim 12, wherein the set of instructions further includes instructions that, when executed by the processor, cause the processor to hash the public key modulus of the parent public key of the parent certificate to obtain the first hash value.

21. The system of claim 12, wherein the set of instructions further includes instructions that, when executed by the processor, cause the processor to provide a token to the device in response to the validating of the child certificate.

* * * * *

UNITED STATES PATENT AND TRADEMARK OFFICE
CERTIFICATE OF CORRECTION

PATENT NO. : 10,375,057 B2  
APPLICATION NO. : 15/418461  
DATED : August 6, 2019  
INVENTOR(S) : Soumendra Bhattacharya and Mohit Gupta Page 1 of 1

It is certified that error appears in the above-identified patent and that said Letters Patent is hereby corrected as shown below:

In the Claims

In Column 22, Claim 9, Line 18 please remove "the parent public key modulus of the parent public key of the" and insert -- the public key modulus of the parent public key of the --

Signed and Sealed this  
Twenty-fourth Day of March, 2020

Andrei Iancu  
*Director of the United States Patent and Trademark Office*